Figure 1:
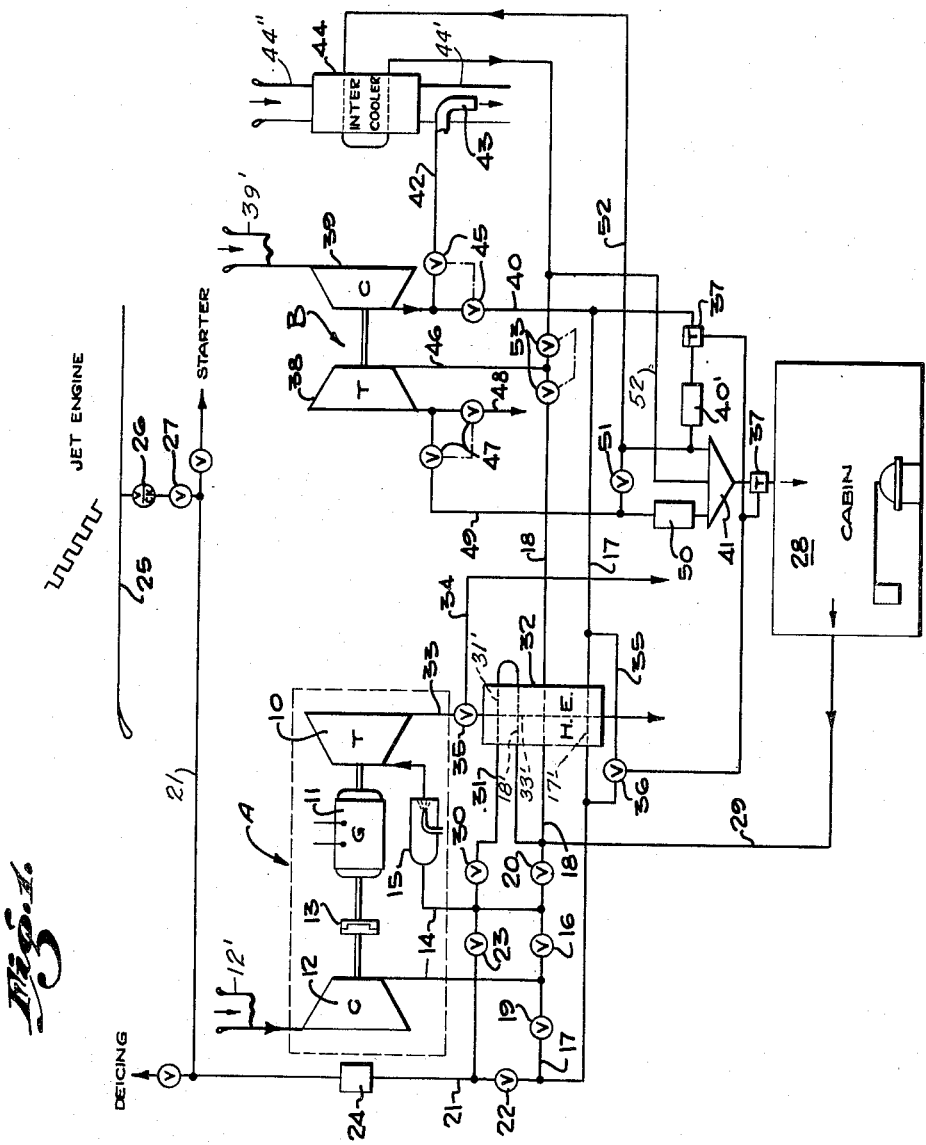

Jan. 15, 1957  J. KUHN  2,777,301
ALL-PURPOSE POWER AND AIR CONDITIONING SYSTEM
Filed June 30, 1952  2 Sheets-Sheet 2
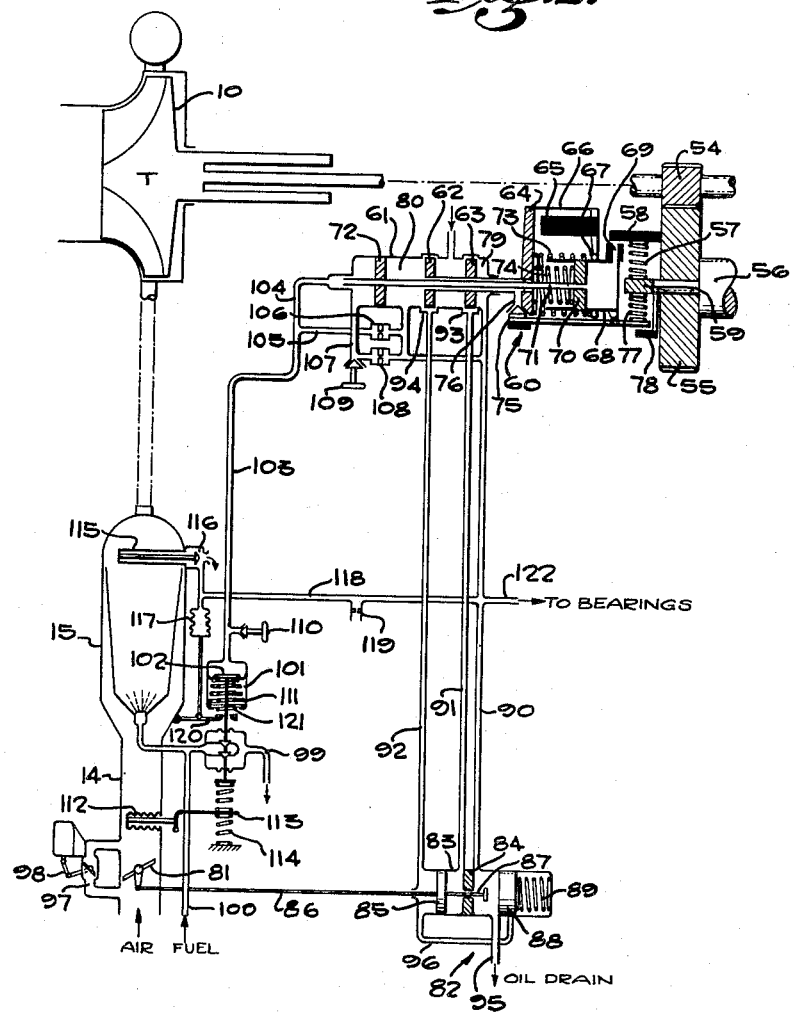
Fig. 2.
JOHN KUHN,
INVENTOR.
BY 
ATTORNEY

United States Patent Office 2,777,301
Patented Jan. 15, 1957

2,777,301

ALL-PURPOSE POWER AND AIR CONDITIONING SYSTEM

John Kuhn, Pacific Palisades, Calif., assignor to The Garrett Corporation, Los Angeles, Calif., a corporation of California Application June 30, 1952, Serial No. 296,439

20 Claims. (Cl. 62—136)

The present invention relates generally to air conditioning equipment, and is more particularly concerned with a novel system for conditioning the ventilating air introduced into the cabin or other enclosure of an aircraft, and associated control therefor.

Considered in its broad concepts, the present invention proposes to provide an all purpose power and air conditioning system which utilizes an auxiliary gas turbine, and which is so arranged that electrical power will be available prior to starting the main engines, and pneumatic power will be available for use in starting the main engines. Moreover, the system, due to its flexible arrangement of components and unique valving arrangement, may be utilized for cooling or heating of the cabin air while the aircraft is on the ground, in low level flight, or during high altitude flight. It is further contemplated that the turbine power devices will have unique governing and control means for regulating normal operation, and providing against the occurrence of emergency conditions and abnormal operation.

It is one object of the hereindescribed invention to provide an air conditioning system which may be utilized separately or in combination with a separate source of compressed air or by bleeding compressed air from the main engines.

A further object is to provide an air conditioning system which includes an auxiliary gas turbine unit and a cooling unit in which an expansion air turbine drives a compressor, and wherein provision is made for utilizing the gas turbine exhaust for heating the air for driving the cooling unit during certain operating conditions of the system.

A further object is to provide in a system such as described herein, an arrangement wherein matched devices may be utilized with a view to minimizing the weight factor, which is at a premium in aircraft.

A still further object is to provide an air conditioning system having a high degree of flexibility and efficiency of operation, and to this end contemplates the provision of unique valving controls, and regulatory controls for the power devices.

Another object is to provide a power source which will be available for the operation of auxiliaries during emergency conditions on the aircraft, since the reliability of power supply is mandatory to flight operation. In this connection, it is further proposed to provide an arrangement wherein the power supply may be maintained independently of the main engines, or may be maintained independent of accessory compressors by making provided connections with the main engines.

Still another object is to provide novel means for controlling the operating fluid of auxiliary turbines, and in the case of a hot gas turbine, to control the fuel supply and supply of combustion supporting fluids, as well as protect the devices against abnormal operating conditions.

It is also an object to provide appropriate valves, orifices, actuators, etc. to form a speed governing system which is essentially independent of altitude or other effects when controlling a pneumatic turbine subjected to wide variations in inlet and outlet pressures and temperatures, and is quick to respond to load and inlet changes, and at the same time adequately protect against emergency conditions of overspeed, overtemperature, bearing damage and load reversals.

Further objects of the invention will be brought out in the following part of the specification, wherein detailed description is for the purpose of fully disclosing the invention without placing limitations thereon.

Referring to the accompanying drawings, which are for illustrative purposes only, Fig. 1 is a view schematically illustrating a power and air conditioning system embodying the features of the present invention; and Fig. 2 is a view schematically illustrating a prime mover control and regulating system, as utilized in the hereindescribed system.

Referring now generally to Fig. 1 of the drawings, the air conditioning system of the present invention is built around an all purpose power package unit, as generally indicated at A.

This power unit is shown as including a hot gas turbine 10 which is operatively connected to drive a generator 11 and a compressor 12, the latter through suitable clutch means 13. The compressor 12 is arranged with a suitable air intake which may be from a ram duct as shown. The compressor is connected through a suitable duct 14 with a conventional combustion chamber 15 by which operating fluid is furnished to the turbine 10. Flow from the compressor through the duct 14 is controlled by a valve 16, and opposite sides of this valve are connected with branch conduits 17 and 18 through valves 19 and 20 respectively.

Provision is also made for conducting air from the compressor 12 for the operation of pneumatic devices, for example the starter of a jet engine, and by suitable valves to conduct air from the jet engine for combustion purposes in the combustion chamber 15. More specifically, a conduit 21 is arranged to supply air from a separate source such as the jet engine, as generally indicated at 25, and is connected by branches through valves 22 and 23 respectively, the first of these branches being connected to conduit 17 downstream of the valve 19, and the other branch being connected to duct 14 between valve 16 and the combustion chamber 15.

As shown, the conduit 21 may be carried through a pressure regulator and shut-off valve 24 to permit utilization of air from the compressor 12, or from the jet engine, as shown, or supercharger in connection with a main engine of an aircraft for deicing purposes, operation of engine starters, and other accessories. Connection with the jet engine would ordinarily be made through a check valve 26 and cut-off valve 27.

Provision is also made for the carrying of exhaust air from the aircraft cabin or other enclosure 28 as a source of combustion air for the turbine 10. As shown, a conduit 29 is connected with the cabin, and through a valve 20 with the duct 14, or alternately through a looped portion 31 and a valve 30 with the duct 14. By means of the portion 31, the exhaust air may be carried through a flow path 31' of a heat exchanger 32 so that the air flowing through the looped portion 31 may be brought into heat exchange relation with the exhaust from the turbine 10 for preheating purposes. The exhaust gases from the turbine 10 are conducted through a conduit 33 and flow path 33' in the heat exchanger 32. However, under some conditions of operation it may be desirable to discharge the exhaust gases from the turbine 10 without passing through the heat exchanger. For such purpose, a branch conduit 34 is provided and connected through a valve 35 with conduit 33 upstream of the heat exchanger, the valve 35 being so arranged that the flow through the heat exchanger and branch conduit 34 may be proportioned, or entirely diverted through one or the other depending upon the operating conditions desired.

The branch conduits 17 and 18 are respectively carried through flow paths 17' and 18' in the heat exchanger 32 so that the fluid flowing therein may likewise be brought into heat exchange relation with the exhaust gases of the turbine 10, if desired. In the case of conduit 17, a bypass 35' is provided to permit bypassing the flow around the heat exchanger, flow through the bypass being controlled by a modulating valve 36 under control of temperature pick-ups arranged at various points in the cabin air delivery conduit, for example, as indicated by the numeral 37.

The system of the present invention also utilizes an air conditioning unit B comprising an air expansion turbine 38 which is loaded by being connected to a compressor 39 having an intake 39' connected to a suitable air source, and in this case illustrated as being a ram duct. The outlet from the compressor 39 is connected through a conduit 40 and demand control 40' with one inlet of a multiple inlet selector valve 41 for controlling inlet air to the cabin 28. It will be noted that prior to reaching the cabin, the conduit 40 has a branch connection with conduit 17 downstream from the heat exchanger 32. Adjacent the compressor 39, the conduit 40 has a connection with a branch conduit 42 for conducting compressed air from the compressor to an aspirator nozzle 43 in an outlet side 44' for the coolant of an intercooler 44, the inlet side for the coolant being connected with a suitable source of cooling air shown in this instance as being a ram duct 44". A suitable valve assembly 45 is provided for selectively and proportionally adjusting flow through the conduit 40 and conduit 42, depending upon the conditions of operation.

The turbine 38 has its inlet connected by means of a conduit 46 with branch conduit 18, after it has passed through the heat exchanger 32. The outlet side of the turbine 38 is selectively connectible by a valve assembly 47 so as to discharge directly through a conduit 48 to atmosphere, or through a conduit 49 which is connected through a water separator 50 with another inlet of the selector valve 41.

A modulating valve 51 has one side connected to conduit 49 upstream of the water separator 50, and its other side connected with a conduit 52, adjacent its connection with conduit 40 downstream of the demand control 40', by which fluid flow may be conducted from this point of connection with conduit 40 through the intercooler and back to another inlet connection of the selector valve 41. After passing through the intercooler, the conduit 52 has a connection with conduit 18, a valve assembly 53 being provided to control the flow on opposite sides of the connection of conduit 46 with conduit 18.

By utilizing a power package unit A and air conditioning unit B with the other components of heat exchanger and intercooler, great flexibility is possible with efficient operation.

Prior to starting up of the main engines of the aircraft, the power unit A may be operated to provide electrical and pneumatic power, the air for combustion in the combustion chamber 15 being supplied from the compressor 12. Compressed air is available through conduit 21, for operating the starter of the main engine, and electricity for ignition purposes is obtainable from the generator 11.

It is not, however, under all conditions of operation, necessary to utilize a compressor 12 as the source of combustion air for the gas turbine 10, since such air may be furnished from a separate source, and with the valve arrangement shown, the combustion chamber 15 may be connected by closing valves 16 and 23, and opening valve 20, to obtain combustion air through conduit 29 from the cabin or enclosure 28. Since the compressor 12 is not being used it may be disconnected by releasing the clutch 13 so that the turbine drives only the generator 11.

In utilizing the turbine for driving only the generator and connected to receive air from the cabin or enclosure 28, compressed air will, in this case, be supplied to the cabin from the compressor 39, driven by the expansion turbine 38, which is, in this case, connected to receive heated exhaust cabin air through the heat exchanger 32 and conduit 18.

The clutch 13 is also advantageous in the event that the compressor 12 should become inoperative or damaged for some reason. Under such an emergency condition, the compressor may be disconnected by the clutch 13 and combustion air for the gas turbine 10 supplied through conduit 21 from the aircraft engine or engines.

The novel arrangement of valves in the flow conduits results in a very flexible arrangement. The cabin conditioning air and combustion air for the gas turbine may be supplied solely from the compressor 12 by closing valves 20, 22, 23 and 30 and opening valves 16 and 19, in which case, the cabin conditioning air will be supplied to branch conduit 17.

It is also possible to connect the system so that cabin air and combustion air for the gas turbine will be supplied solely from the aircraft engines by bleeding through conduit 21, closing valves 16, 19, 20 and 30, and opening valves 22 and 23.

In still another arrangement, it is possible to take the cabin conditioning air from the compressor 12 or by bleeding from the main engines, or a combination of both, and supply combustion air for the gas turbine 10 from another source such as from the cabin or enclosure 28. For effecting this arrangement, the valves 16 and 23 would be closed, and valves 19 and 22 selectively closed or proportionally opened to divided the supply of air from the compressor and bleed from the main engines. The valve 20 is in this case opened, while valve 30 is closed, thus permitting air from the cabin 28 to flow through conduit 29, through the valve 20 and duct 14 to the combustion chamber 15.

For ground and low flight conditions when there is an absence of ram pressure, or the ram pressure is at most a variable quantity depending upon the speed of the aircraft, it is contemplated that the cabin conditioning air will be supplied through the conduit 17 from a source such as described above. Provision is made in this case for modulating of the valve 36 in the by-pass 35' so as to control the temperature of the conditioning air, and provision is further made for conducting the conditioning air directly to the cabin or through various degrees of cooling as required. After passing through the heat exchanger, the conditioning air is carried through a portion of conduit 40, and through the demand control 40', and thence through selector valve 41 to the cabin. Should cooling be required, the valve 41 may be manipulated to open the intermediate passage into the cabin, thus permitting the conditioning air to flow through conduit 52 so as to be brought into heat exchange relation with the coolant of intercooler 44. In flight, this coolant will be under ram pressure.

Additional cooling may be obtained, when required, by shifting the valve 41 so that the left hand inlet, as shown in Fig. 1 is opened. Under such condition, the return flow from the intercooler will be passed through the expansion turbine 38. This is accomplished by opening the right side of valve 53 and closing its left side, and closing the right side of valve 47 and opening its left side.

It will be observed that when the expansion turbine 38 is being operated to drive the compressor 39, the valve 45 may be actuated so as to close its left side and open its right side so as to permit the air discharged from the compressor to pass through the conduit 42 and be discharged from the aspirator nozzle 43 on the downstream side of the coolant discharge of the cooler 44, so as to augment the flow of coolant therethrough.

For high altitude operation, the flexibility of the system of the present invention permits a different arrangement of the component parts to be utilized. Under this flight condition, the main supply of conditioning air may be taken from either the compressor 12 or led from the aircraft engines. In either case, the valve 16, 20 and 23 are closed, the valves 19 and 22 being selectively opened or proportionally opened to proportion the flow into the conduit 17.

The combustion air for the gas turbine 10 may be taken from the bleed source, the compressor 12, or from the exhaust air of the cabin through conduit 29 and valve 20. The efficiency of the system is further increased by bleeding exhaust cabin air through conduit 18, the heat exchanger 32, the open left side of valve 53, thence through the expansion turbine 38, and overboard through the open right side of valve 47. The power thus recovered is utilized for driving the compressor 39 which may be connected by opening the left side of valve 45 and closing its right side, so as to augment the supply of compressed air received through the conduit 17 for conditioning the cabin 28.

Referring now specifically to Fig. 2 of the drawings, the details of the unique control will now be described, whereby the operation of the gas turbine may be regulated. Although this control will be described with reference to a turbine such as the gas turbine 10 as utilized herein, it is to be appreciated that the control is of such character that it may be utilized with equal facility for the general control of power turbines, as well as pneumatic turbines which may be subjected to wide variations in inlet and outlet pressures and temperatures, and is quick to respond in a precise manner to load or inlet changes, while incorporating adequate protection against emergency conditions of overspeed, overtemperature, bearing damage, and load reversal.

For illustrating this part of the invention, the driving shaft of the turbine 10 is shown as having a power take-off through speed reduction gearing consisting of a pinion 54 which meshes with a driving gear 55. The driving gear 55 drives a shaft 56 through a loading spring 57 interposed between a loading bar 58 and a driving crank arm 59 carried by the shaft 56.

For sensing a plurality of driving conditions of the turbine, there is provided a sensing governor as generally indicated by the numeral 60. This governor includes a pilot valve in which a housing 61 containing spaced control valves 62 and 63 which are carried by a tubular shaft having connection at one end for rotatable and reciprocable movement with a valve head 64. This valve head is schematically shown as having associated therewith a flyweight 65 which is connected with the valve head through a flexible strap 66 and pivoted as shown at a point 67 upon a cylinder 68 connected for rotation with shaft 56 and having an open end facing the valve head 64 and a closed end facing the driving gear 55. The flyweight is outwardly spaced from the cylinder and has its center of gravity radially offset with respect to the pivot point 67 so that movements of the flyweight act to reciprocate the valve head.

The closed end of the cylinder 68 communicates with a port opening 69 which is controlled by the relative position of the loading bar 58. That is, as the load on the shaft 56 increases, the spring 57 will be compressed a greater amount, and the loading bar 58 will be moved into closer proximity to the crank arm 59. This movement operates to produce a greater restriction of the port opening 69, whereas upon decrease of load, greater flow will be permitted through the port opening 69.

Positioned within the cylinder 68 is a piston 70 which is carried by a hollow piston rod 71 which communicates with the side of the piston facing the bottom of the cylinder 68. The piston rod 71 extends through the hollow shaft upon which the control valves 62 and 63 are mounted, and at its projecting end is fitted with a piston 72. The valve head 64 and connected tubular shaft are normally slidably biased towards the left on the piston rod 71, as shown on the drawings, by a speed spring 73. A droop control spring 74 is positioned with its ends respectively engaging the valve head 64 and the piston 70 so as to normally act in a direction forcing these parts away from each other.

By utilizing an offset flyweight 65, as shown, the flyweight becomes sensitive to the rate of change of speed as well as to the absolute magnitude of the speed. This rate or derivative action has a strong stabilizing effect when a pilot valve and servo ram are utilized without direct feed back.

To protect against overspeed, a speed responsive valve member in the form of a lever 75 is pivotally mounted on the cylinder 68 and biased toward seated position over a port opening 76 in communication with the interior of the hollow shaft which carries the control valves 62 and 63. This lever is biased toward seated position by a spring 77, and is weighted at its valve end to sense and react to overspeeds.

For protection against reverse torque due to the tendency of shaft 56 to drive the driving gear 55 in reverse direction, a projection 78 is arranged on the driving gear so as to engage the lever 75 and actuate it to an unseated position, to shut down the turbine in a manner which will subsequently be explained.

A source of high pressure oil connects with the housing 61 so as to be between the control valves 62 and 63 and these valves are underlapped, as shown, to permit slight flow past their peripheries into spaces 79 and 80.

The duct 14 for feeding combustion supporting air to the combustion chamber 15 is provided with a throttle valve 81, which is controlled by an actuator 82 which comprises a cylindrical housing 83 having a wall 84 between its ends. This wall cooperates to form a cylinder at one end of the housing 83 for a piston 85 supported for reciprocal movement therein and operatively connected with an actuating rod 86 connected to the throttle valve 81 at one end, and having its other end projecting through the wall 84 to form a shut down prod 87.

On the other side of the wall 84, there is provided a piston 88 which is biased toward the prod by an expansion spring 89.

The left side of the piston 88 is in communication with a supply conduit 90 which connects with the space 79 of the housing 61 of the sensing governor. The opposite sides of the piston 85 are in communication with conduits 91 and 92 which connect with the underlapped cylindrical wall portions 93 and 94 respectively, of the housing 61. It will be apparent from a consideration of the movement of piston 88 that it is arranged to act as an oil pressure regulator by controlling flow through a drain connection 95; and, when in a left limiting position, is arranged to open a bleed conduit 96 so as to enable the engagement of the piston 88 with the prod 87 and actuate the throttle valve 81 to fully closed position. Regulatory adjustment of the throttle valve 81 is, of course, accomplished by the action of the valves 62 and 63 in varying the pressure differential in conduits 91 and 92, the operation of these valves being stabilized by the action of the flyweight 65 in response to speed changes.

A starting bypass 97 is provided around the main throttle valve 81 for use during starting, this bypass being controlled by a suitable valve 98.

Supply of fuel to the combustion chamber 15 may be accomplished in any suitable manner. In the present instance, a fuel control valve 99 is arranged to control a bleed connection with a main fuel supply conduit 100.

The control valve 99 is operated by a load responsive servo mechanism 101 having a housing within which there is supported a movable wall 102 forming a diaphragm. The upper side of the diaphragm 102 is in communication with a fluid pressure by means of conduit 103 the upper end of which communicates through a branch connection 104 with the left side of piston 72, and a branch connection 105 which communicates through a restricted droop orifice 106 with the other side of piston 72 and with conduit 90.

Another connection 107 is provided from the left side of piston 72 and through a restricted speed orifice 108 to the other side of the piston 72 and to the conduit 90.

A bleed valve 109 is provided for adjusting speed changes by altering the pressure acting on the left side of piston 72, whereby the piston may be moved to change its normal position, such movement being carried back to the flyweight 65 through the action of spring 74 and movement of valve head 64. A bleed valve 110 is similarly provided in the conduit 103 for adjusting droop by altering the pressure acting on movable wall 102.

The other side of movable wall 102 is biased by a compression spring 111 which opposes the action of fluid pressure.

The operation of the fuel control valve 99 is further compensated for pressure and temperature conditions, as will be explained. As thus far explained, it will be seen that the fuel supply regulation will depend primarily on the pressure in the load sensing conduit 103 which in turn depends on the load demand. In actual practice the valve 110 and the spring 111 in the load responsive servo mechanism might be interconnected so that the positioning of the valve varies the loading in the servo mechanism to prevent undesirable variations in combustion chamber temperature with changes in droop regulation. It is a characteristic of the thermodynamic cycle of a gas turbine such as illustrated that the air flow is a function of the output torque for a given turbine inlet pressure and temperature over a wide range of pressure ratios. By modifying the spring force acting on the movable wall 102 in proportion to the turbine inlet pressure, the equivalent of a constant turbine inlet temperature may be maintained. Moreover by further varying the same spring loading by differential expansion of the parts of this sensor, the fuel supply may be varied in accordance with the entering temperature to maintain essentially a constant temperature out of the combustion chamber. For this purpose, there is provided a combined potential and temperature sensor 112 arranged to act through a pivotal arm 113 to vary the effect of a loading spring 114 having an operative connection with the movable wall 102 of the load responsive servo mechanism.

At the discharge end of the combustion chamber, there is provided a temperature regulator 115 having a valve 116 for regulating the amount of bleed from a temperature trim fluid actuated bellows 117 having a connection through conduit 118 with conduit 90 as a source of fluid supply, the pressure in the conduit 118 being normally determined by means of a temperature trim restricted orifice 119. The bellows 117 is mechanically connected with a swingably mounted arm 120 having its outermost end connected with the movable wall 102 by means of a tension spring 121.

The temperature regulator 115 has an inherently large time lag. As a consequence, the load sensing system assumes primary control during temperature transients while the amount of the transient and the magnitude of the steady state temperature is essentially established by the regulator. With this system, it would also be possible to add a pressure compensation means to the fuel nozzle of the combustion chamber to counteract the effect of pressure fluctuations in a combustion chamber on the characteristics of the fuel spray e. g. fuel flow, spray angle, droplet size, etc.

The utilization of underlapped wall portions 93 and 94 in connection with the control valve 62 and 63 is of particular benefit in that it has the effect of increasing the resulting viscous damping of the hydraulic servo system. In addition, the use of such an arrangement in connection with a positive displacement pump for supplying the high pressure oil provides small pressure variations during small speed changes to obtain good speed control, while for large speed changes it is possible to exert the maximum pressure on the actuating rod 86 so as to prevent "hanging-up" of the throttle valve 81 for any reason.

The utilization of an oil pressure regulator in combination with the throttle valve actuator 82 provides a system which is most readily adapted to protect against abnormal operation and operation under undesired emergency conditions. In this connection, advantage is taken of the artificial lowering of pressure in the conduit 90 and spaces in communication therewith to shut down the equipment. Such artificial lowering of pressure may result, for example, from unbalancing of the overspeed lever 75 due to overspeed or reversal of power, whereupon bleed past the underlapped valves 62 and 63 may lower the pressure in conduit 90. The latter condition arises when the connected load tends to overdrive the turbine, and is undesirable from the standpoint of excessive power consumption and the possibility of malfunctioning of the turbine drive.

For the protection of bearings, a conduit 122 may be connected with the conduit 90. A damaged bearing will inevitably increase flow by virtue of the greater gaps and thus cause the oil pressure to drop. It is also contemplated that thermally sensitive controlled orifices might also be installed at the entrance of these bearings, which would operate in a similar manner to the temperature regulator 115 and would warn against an overtemperature condition, as well.

The present invention is susceptible of broad application and may be utilized to control an air turbine motor, a gas turbine motor, or a complete gas turbine in which case the inlet air throttle would be replaced with benefit by some means to control the air flow into the compressor. The invention could also be used to control the operation of a variable area nozzle turbine drive by modifying the action of the load responsive servo mechanism 101 in accordance with the variation in nozzle area. In the turbo-jet installation, the actuator 82 could be utilized to position a tail bullet instead of an inlet throttle.

Various modifications may suggest themselves to those skilled in the art without departing from the spirit of my invention, and hence, I do not wish to be restricted to the specific form shown or uses mentioned, except to the extent indicated in the appended claims.

I claim:

1. The combination, comprising: a gas turbine having an inlet and exhaust outlet; a combustion chamber connected to the turbine inlet; a compressor driven by said turbine, said compressor having a discharge outlet; a duct connecting the compressor discharge outlet with said turbine combustion chamber; a separate source of compressed air; a heat exchanger connected to receive the exhaust from said turbine, said heat exchanger having first and second flow paths for passing air therethrough in heat exchange relation with said exhaust; a first valve in said duct adapted to disconnect the compressor discharge outlet with respect to the combustion chamber; branch conduits respectively connecting said duct on opposite sides of said first valve with said first and second flow paths respectively; a second valve in one of said branch conduits; a third valve in the other of said branch conduits, said second and third valves being operable to select the flow path from said duct through the heat exchanger and control the flow in said paths; a fourth valve in a conduit connecting said separate source of compressed air with one of said branch conduits between its associated valve and the heat exchanger for controlling the amount of air delivered from said separate source, under one condition of operation; and a fifth valve in a bypass connection around said first valve, one of said branch conduit valves and said fourth valve for controlling supply of air from said separate source to said combustion chamber under another condition of operation.

2. An air conditioning system for an enclosure, comprising: a gas turbine unit including a turbine having a driving connection with an electric generator, and a compressor adapted to furnish combustion air to said turbine through a path containing said enclosure; an independent source of compressed air adapted to supply air to said path; means for selectively connecting said compressor and said source to said path; and a clutch for disconnecting said compressor with respect to said turbine, when said source is connected to said path, whereby the turbine may drive the generator for electrical power purposes.

3. Air conditioning means for an enclosure, comprising: a cooling unit including power means having a driving connection with air moving means; a flow path for conducting an air conditioning medium to said enclosure; a heat exchanger in said path for passing the conditioning medium in heat exchange relation to a coolant; air actuated means for moving said coolant; and means for selectively connecting the discharge of said air moving means with said coolant moving means and said flow path.

4. Air conditioning means for an enclosure, comprising: a cooling unit including power means having a driving connection with air moving means; a flow path for conducting an air conditioning medium to said enclosure; a heat exchanger in said path for passing the conditioning medium in heat exchange relation to a coolant; an aspirator nozzle for inducing flow of said coolant; and means for selectively connecting the discharge of said air moving means with said aspirator and said flow path.

5. Air conditioning means for an enclosure, comprising: means for cooling and circulating air in a flow path including said enclosure; air expansion power means; and means for selectively connecting said air expansion power means in said path of flow upstream of said enclosure for one condition of operation and in said path of flow downstream from said enclosure for another condition of operation.

6. Air conditioning means for an enclosure, comprising: means for cooling and circulating air in a flow path containing said enclosure therein; air expansion power means; means for selectively connecting said air expansion power means in said path of flow upstream of said enclosure for one condition of operation and in said path of flow downstream from said enclosure for another condition of operation; and means for heating said air in said latter condition of operation prior to its reaching said expansion power means.

7. Air conditioning means for an enclosure, comprising: a source of conditioning air for said enclosure; a first flow path for conducting said conditioning air directly to said enclosure; a heat exchanger having connection with a source of coolant; a second flow path for conducting said conditioning air to said enclosure through said heat exchanger; means for converting energy of said air into mechanical energy; means including air circulating means driven by said energy converting means for moving said coolant through said heat exchanger; a third flow path for conducting said conditioning air to said enclosure including said heat exchanger and said energy converting means; and means for selectively determining flow through said flow paths.

8. Air conditioning means for an enclosure, comprising: means for supplying air under pressure to said enclosure; a hot gas turbine arranged to receive combustion air from said enclosure; a heat exchanger in the exhaust discharge from said turbine; means for conducting enclosure exhaust air through said heat exchanger into heat exchange relation with said turbine exhaust; air compressing means connected to supply air under pressure to said enclosure; and means for converting energy of said heated enclosure exhaust air into mechanical energy, and having a driving connection with said air compressing means.

9. Air conditioning means for an enclosure, comprising: means for supplying air under pressure to said enclosure; a hot gas turbine arranged to receive combustion air from said enclosure; a heat exchanger in the exhaust discharge from said turbine; means for conducting enclosure exhaust air through said heat exchanger into heat exchange relation with said turbine exhaust; air compressing means connected to supply air under pressure to said enclosure; means for converting energy of said heated enclosure exhaust air into mechanical energy, and having a driving connection with said air compressing means; and means for conducting combustion air for said turbine through said heat exchanger for preheating prior to delivery to said turbine.

10. Air conditioning means for an enclosure, comprising: a first turbine driven unit including a gas turbine having a driving connection with a compressor connected to furnish combustion air to said turbine through a path containing said enclosure; a second turbine driven unit including an air expansion turbine having a driving connection with a compressor connected to furnish air to said enclosure; a heat exchanger in the exhaust from said gas turbine; and duct means for conducting air from said enclosure through said heat exchanger to said air expansion turbine.

11. Air conditioning means for an enclosure, comprising: a first turbine driven unit including a gas turbine having a driving connection with a compressor connected to furnish air to said enclosure; duct means for conducting enclosure exhaust air to said gas turbine; a second turbine driven unit including an air expansion turbine having a driving connection, independent of the driving connection of said first unit, for operating a compressor connected to furnish air to said enclosure; a heat exchanger in the exhaust from said gas turbine; and a conduit for bleeding enclosure exhaust air from said duct means through said heat exchanger to said air expansion turbine.

12. The combination, comprising: a gas turbine having an inlet and an exhaust outlet; a combustion chamber connected to the turbine inlet; a compressor driven by said turbine, said compressor having an inlet connected to atmosphere, and a discharge outlet; a duct connecting the compressor discharge outlet with said turbine combustion chamber; a valve in said duct for controlling flow therethrough; a separate source of compressed air connected to a supply conduit having a flow connection with said duct on the combustion chamber side of said valve; a conduit for delivering air to a use location, said conduit having a flow connection with said duct on the compressor side of said valve; and other valves respectively controlling the flow connections of said conduits with said duct.

13. The combination, comprising: a gas turbine having an inlet and an exhaust outlet; a combustion chamber connected to the turbine inlet; a compressor driven by said turbine, said compressor having an inlet connected to the atmosphere, and a discharge outlet; a duct connecting the compressor discharge outlet with said turbine combustion chamber; a valve in said duct for controlling flow therethrough; a separate source of compressed air connected to a first conduit having a flow connection with said duct on the combustion chamber side of said valve; means for controlling flow through said first conduit; a second conduit for delivering air to a use location, said conduit having a flow connection with said duct on the compressor side of said valve; and means for controlling flow through said second conduit.

14. The combination, comprising: a power unit including a gas turbine having a driving connection with an electric generator and a compressor having its inlet connected to atmosphere; a clutch in the driving connection of the compressor; a duct connecting the compressor discharge with a turbine combustion chamber; a valve in said duct for controlling flow therethrough; a separate source of compressed air connected to a first conduit having a flow connection with said duct on the combustion chamber side of said valve; means for controlling flow through said first conduit; a second conduit for delivering air to a use location, said conduit having a flow connection with said duct on the compressor side of said valve; and means for controlling flow through said second conduit.

15. The combination, comprising: an aircraft main engine; a compressor driven by said main engine; a gas turbine having an inlet and an exhaust outlet; a combustion chamber connected to the tubine inlet; a compressor driven by said turbine, said compressor having an inlet connected to atmosphere, and a discharge outlet; a duct connecting the compressor discharge outlet with said turbine combustion chamber; a valve in said duct for controlling flow therethrough; a first conduit for bleeding air from the main engine compressor, said conduit having a flow connection with said duct on the combustion chamber side of said valve; means for controlling flow through said first conduit; a second conduit for delivering air to a use location, said conduit having a flow connection with said duct on the gas turbine compressor side of said valve; and means for controlling flow through said second conduit.

16. The combination, comprising: a gas turbine; a compressor driven by said turbine, said compressor having an atmospheric air inlet, and a compressor air outlet; a valve controlled duct connecting said outlet with a point of use; a valve controlled duct connecting said outlet to furnish combustion air to said gas turbine; and a valve controlled bleed duct from a separate source of air connected to supply combustion air to said turbine.

17. The combination, comprising an aircraft main engine; a compressor driven by said engine; a gas turbine a compressor driven by said turbine; duct connections from said compressors for furnishing combustion air to said gas turbine, and a duct for conducting air from the turbine driven compressor to a point of use; and valves for respectively controlling flow in each of said ducts.

18. The combination, comprising: a gas turbine having an inlet and an exhaust outlet; a combustion chamber connected to said turbine inlet; a compressor driven by said turbine, and having an outlet; a duct connecting the compressor outlet with said combustion chamber; a heat exchanger having flow passages in heat exchange relation, one of said passages being connected into said duct, and the other of said passages being connected to said turbine exhaust outlet; a bypass for said one passage; valve means for controlling said bypass; a bypass for said other passage; and valve means for controlling said latter bypass, whereby the turbine exhaust may be discharged selectively through said heat exchanger and through said associated bypass.

19. The combination, comprising: a gas turbine having an inlet and an exhaust outlet; a combustion chamber connected to said turbine inlet; a compressor driven by said turbine, and having an outlet; a duct connecting the compressor outlet with said combustion chamber; a heat exchanger having flow passages in heat exchange relation, one of said passages being connected into said duct immediately upstream from said combustion chamber, and the other of said passages being connected to said turbine exhaust outlet; a bypass for said other passage; and valve means for controlling said bypass, whereby the turbine exhaust may be discharged selectively through said heat exchanger to preheat the air supplied to the combustion chamber and through said associated bypass.

20. The combination, comprising: a gas turbine having an inlet and an exhaust outlet; a combustion chamber connected to said turbine inlet; a compressor driven by said turbine, and having an outlet; a duct connecting the compressor outlet with said combustion chamber; a conduit for furnishing air from a separate source to a point of use; a heat exchanger having flow passages in heat exchange relation, one of said passages being connected into said conduit, and the other of said passages being connected to said turbine exhaust outlet; a bypass for said other passage; and valve means for controlling said bypass, whereby the turbine exhaust may be discharged selectively through said heat exchanger and through said bypass.

References Cited in the file of this patent

UNITED STATES PATENTS

| | | |
|---|---|---|
| 2,219,994 | Jung | Oct. 29, 1940 |
| 2,391,838 | Kleinhans | Dec. 25, 1945 |
| 2,409,159 | Singleton | Oct. 8, 1946 |
| 2,415,064 | McCollum | Jan. 28, 1947 |
| 2,472,924 | Schwendner | June 14, 1949 |
| 2,491,461 | Wood | Dec. 13, 1949 |
| 2,573,724 | Neal | Nov. 6, 1951 |
| 2,585,570 | Messinger | Feb. 12, 1952 |
| 2,592,749 | Sedille et al. | Apr. 15, 1952 |
| 2,599,480 | Pfenninger | June 3, 1952 |
| 2,613,500 | Lysholm | Oct. 14, 1952 |
| 2,617,253 | Fusner | Nov. 11, 1952 |
| 2,628,482 | Burgess | Feb. 17, 1953 |
| 2,677,932 | Forsling | May 11, 1954 |

FOREIGN PATENTS

| | | |
|---|---|---|
| 531,997 | Great Britain | Jan. 15, 1941 |